United States Patent [19]
Nigro et al.

[11] Patent Number: 6,112,715
[45] Date of Patent: Sep. 5, 2000

[54] PISTON FOR AN INTERNAL COMBUSTION ENGINE

[75] Inventors: Eduardo Bueno Nigro; José Valentim Lima Sarabanda, both of São Paulo—SP; Marcos Clemente, São Caetano do Sul—SP; Germano Moreira de Almeida, São Paulo—SP, all of Brazil

[73] Assignee: Metal Leve S.A. Industria E. Comercio, Sao Paulo -SP, Brazil

[21] Appl. No.: 09/202,730

[22] PCT Filed: Jun. 13, 1997

[86] PCT No.: PCT/BR97/00035

§ 371 Date: Mar. 19, 1999

§ 102(e) Date: Mar. 19, 1999

[87] PCT Pub. No.: WO97/48895

PCT Pub. Date: Dec. 24, 1997

[30] Foreign Application Priority Data

Jun. 14, 1996 [BR] Brazil ...................................... 9601835

[51] Int. Cl.[7] ........................................................ F02F 3/26
[52] U.S. Cl. .......................................... 123/279; 123/193.6
[58] Field of Search ................................. 123/279, 193.6; 92/208

[56] References Cited

U.S. PATENT DOCUMENTS

| | | | |
|---|---|---|---|
| 4,779,587 | 10/1988 | Schweinzer et al. ...................... | 123/279 |
| 5,115,770 | 5/1992 | Yen et al. .............................. | 123/193.6 |
| 5,169,462 | 12/1992 | Morley et al. . | |
| 5,404,792 | 4/1995 | Watanabe et al. . | |
| 5,487,364 | 1/1996 | Takeda et al. ......................... | 123/193.6 |
| 5,778,533 | 7/1998 | Kemnite ............................... | 123/193.6 |
| 5,901,678 | 5/1999 | Bielaga ................................ | 123/193.6 |

FOREIGN PATENT DOCUMENTS 0 640 759 A1   3/1995   European Pat. Off. .
43 26 978 A1   2/1995   Germany .

Primary Examiner—John Kwon
Attorney, Agent, or Firm—Darby & Darby

[57] ABSTRACT

A piston which has a diameter of about 70 to about 100 mm and which is preferably produced with a resistant, malleable alloy having low density (lower than about 3 g/cm$^3$) and mechanical properties at high temperatures such that a yield stress greater than about 120 Mpa at temperatures of the order of 300° C. to 350° C. is obtained. In the preferred embodiment, the piston is a single piece piston, comprising a head portion of diameter D ranging from about 70 to about 100 mm and a skirt portion downwardly projected from the head portion and inside which is provided a pair of wrist pin bosses, each having a hole with a diameter d and axial extension L for bearing the articulating wrist pin of the piston. The embodiment described improves the efficiency that the piston gives to the engine because it maintains the piston resistance at high levels while reducing its weight such that the piston operates at a rate of at least about 17 grams of weight per each kilowatt of power for each engine cylinder.

6 Claims, 2 Drawing Sheets

PISTON FOR AN INTERNAL COMBUSTION ENGINE

FIELD OF THE INVENTION

The present invention refers to a piston for an internal combustion engine. More specifically, the invention refers to a piston for a high speed Diesel engine.

BACKGROUND OF THE INVENTION

High speed Diesel engines or simply HSD engines, usually used in passenger and light load cars, have as operational characteristics: high speed, around 4,500 rpm, peak combustion pressures (PCP) over 9 or 12 MPa, usually 14 MPa, and maximum piston temperatures of about 330 degrees Celsius. These engines should be equipped with pistons which are highly resistant to high thermal and mechanical efforts and, besides this, it is desirable that the pistons in these engines have low operational noise, reduced weight and low manufacturing cost.

In order to meet the operational requirements of the HSD engines, nowadays there are several piston constructions, resulting from different technical approaches, as discussed below.

In a first technical approach, already known from the German Patent Applications DE 26 07 624, DE 36 39 806, DE 31 19 113, DE 34 44 406 and DE 40 10 474, the pistons are constructed in a light and relatively maleable metal, consequently having low weight and relative elasticity in order to absorb the impacts against the cylinder, which is advantageous in terms of reducing the operational noise. On the other hand, the piston constructions described in said applications have in common thick walls and local reinforcements in order to increase their mechanical resistance. In general, the thickening of walls and the local reinforcements are provided in regions of very high efforts, such as the region of the piston rings (ring-carriers), around the edge of the combustion chamber (fiber collars) and in the wrist pin bosses for supporting the wrist pin articulating the connecting rod, by inserting bushings therebetween. Wall thickening and reinforcement insertion is a common practice to impart more resistance to the light metal pistons, in order to overcome resistance deficiencies during operation and it is not an advantageous technical approach. The manufacture of pistons according to this approach, besides being technically difficult, is costly and many times does not result in a piston with long useful life or with a sufficiently low operational noise so that the engine may satisfy the present and future environmental requirements because, as the walls are thickened, specially in the parts contacting the cylinder, the resistance gain occurs to the detriment of the elasticity, and the insertion of local reinforcements increases the weight and brings risks to the piston reliability, mainly due to the integral connection with the reinforcement.

In order to increase the resistance of the piston, without thickening the walls or applying local reinforcements, it is possible to construct said piston with more resistant materials, such as iron or steel but, again, the weight would relevantly increase, while the elasticity would decrease, impairing the efficiency of the engine and increasing its noise level, respectively.

Besides these approaches, more recently, Patent Application published with the No. WO 95/04880 has suggested the combination of a more resistant aluminum alloy with a certain piston construction, which would resist to the characteristic efforts of the HSD engines, being provided with thinner walls and without using local reinforcements.

According to the concept described in said patent application, in order to reduce the piston weight, there is provided a certain reduction in the thickness of the skirt walls on the pressure and counter pressure sides of the piston, both radially and circumferentially, taking into account the dimensional limitations for shaping other portions of the piston, such as compression height and wrist pin bosses dimensions, only to mention some of said limitations.

Although it can resist to efforts, a piston constructed according to this last approach would still be considered heavy and with a high operational noise, regarding the highest requirements of the car manufacturers, since the parts of said piston, which are the object of the modifications proposed in said patent application, specially the piston and combustion chamber diameters, compression height and those dimensions for the wrist pin bosses, offer very little possibility to reduce their dimensions, because they have to be worked so as to adjust to the ranges of the basic dimensional specifications given by the engine manufacturers (engine baseline).

The piston overweight leads to engine power loss, since a significant part of the energy generated in the combustion ceases to be transferred to move the vehicle, said energy being internally consumed to draw the piston itself. An expressive number to evaluate how much the piston weight represents to the engine is the rate that comprises the piston weight for each kilowatt of the engine power, this rate, even for the HSD engine pistons considered lighter by the prior art, ranging around 24 to 26 grams per kilowatt of power for each engine cylinder. The low elasticity in the piston portions that contact the cylinder during its stroke, also known as pressure and counter pressure sides, results in an undesirable operational noise, generated by the piston strikes against the cylinder.

Disclosure of the Invention

Based on this technique, the objective of the invention is to provide a piston which has a diameter of about 70 to about 100 min and which is to be preferably produced with an alloy having low relative weight, high resistance and good maleability and which will hereinafter indicated as a light and resistant alloy, such as an alluminum alloy obtained by a quick solidification process, said piston having a construction that overcomes the deficiencies cited above and also has many advantages over the already known pistons as detailed below. According to the invention, the light and resistant alloy should have low density, lower than about 3 g/cm$^3$ and good mechanical properties at high temperatures, obtained with a yield stress higher than about 120 MPa at temperatures of the order of 300° C. to 350° C.

It has been surprisingly observed that an expressive weight reduction occurs when, according to a first aspect of the invention, besides reducing the wall thickness of the piston taking into account the limitations set up by the engine manufacturer, there are established determined reductions in some piston parts that can be worked more freely, without interfering with the engine baseline, particularly the reductions in the thickness of the wall which defines the bottom of the combustion chamber and in the area of the wrist pin bosses for supporting said pin and in the axial height of the burning zone above the upper ring adjacent to the top.

Particularly, such arrangement according to the invention has as a main effect the improvement in the efficiency that the piston gives to the engine, because it maintains the piston resistance at high levels, and at the same time reduces its weight in order to place it in a surprisingly satisfactory rate of at least about 17 grams of weight per each kilowatt of power for each engine cylinder, whereas in the pistons already mentioned before, this same rate ranges around the minimum of 24 grams of weight per each kilowatt of the power for each engine cylinder. Such effect is obtained, since, as detailed below, the constructive arrangements imposed to the piston causes a large reduction in the mass thereof, increasing the useful power of the engine, as well as reducing the emission of hidrocarbons and particulate material. Its production cost is lower, since the use of thick walls is eliminated, and its reliability is greater, due to the elimination of local efforts and also for dispensing the use of bushings between the pin and the connecting rod and for requiring less time to manufacture with less complexity.

According to a second aspect of the invention, more related to elasticity, without ceasing to contribute to weight reduction, it has been observed a gain in the elasticity of the skirt by providing recesses at the edges of lateral walls which connect the pressure and counter pressure sides of the piston skirt.

Due to the disposition of the recesses as detailed below, the pressure and counter pressure sides of the piston skirt have more flexibility towards the center of the piston, which allows dampening the impacts of the piston against the cylinder, thereby reducing its operational noise. In an advantageous construction, said recesses are respectively associated with different skirt axial lengths at both the pressure and counter pressure sides, which additionally gives more balance to the piston during its displacement inside the cylinder.

BRIEF DESCRIPTION OF THE DRAWINGS

The invention will be described below, with reference to the attached drawings, which are merely illustrative and which represent some embodiments. In the drawings.

BEST MODE FOR CARRYING OUT THE INVENTION

Figure 1:
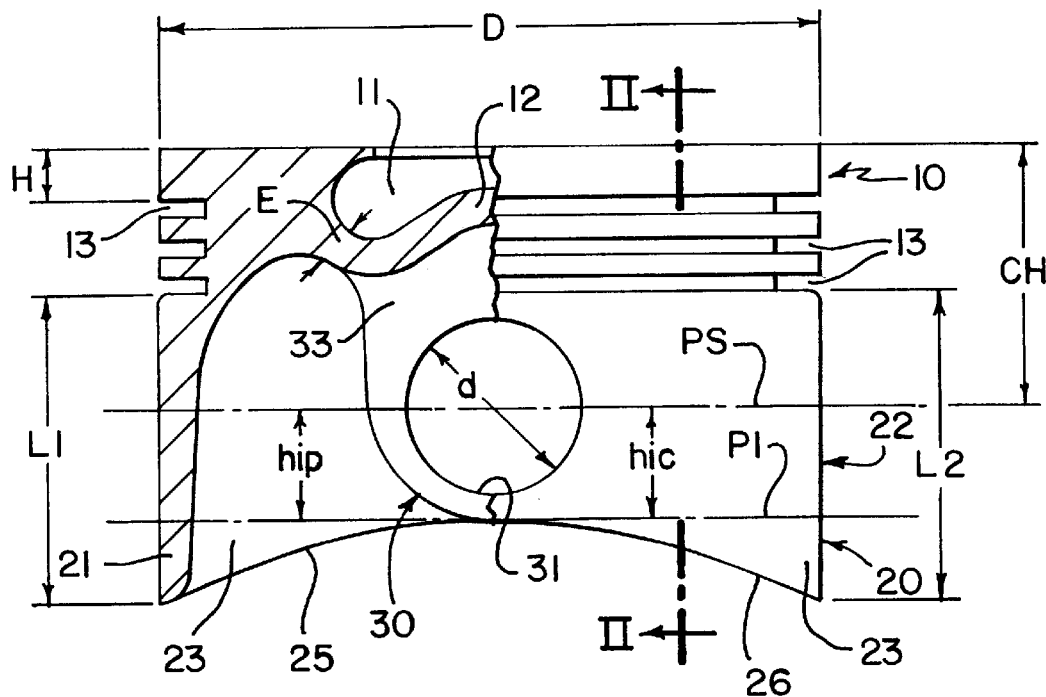
FIG. 1 represents an elevational view of the piston of the invention, taken in the oscillating plane of the connecting rod, with a partial sectional view at the pressure side of the piston.

According to the attached drawings, the piston of the present invention is a single piece piston, comprising a head portion 10 of diameter D ranging from about 70 to about 100 mm, and a skirt portion 20, which is downwardly projected from the head portion 10 and inside which is provided a pair of wrist pin bosses 30, each having a hole 31 with a diameter d and axial extension L for bearing the articulating wrist pin of the piston (not illustrated).

The head portion is provides with an upper median recess, defining a combustion chamber 11 with a bottom wall 12 of a thickness E and, externally and laterally with a plurality of peripheral grooves 13 to which are mounted respective piston rings (not illustrated).

In the piston type considered herein, the skirt portion 20 extends downwardly from the piston head 10, from the lowermost peripheral groove 13, through a first skirt axial extension 21, located on the pressure side of the piston and having a length L1, and a second skirt axial extension 22 located on the counter pressure side of the piston and having a length L2.

Figure 2:
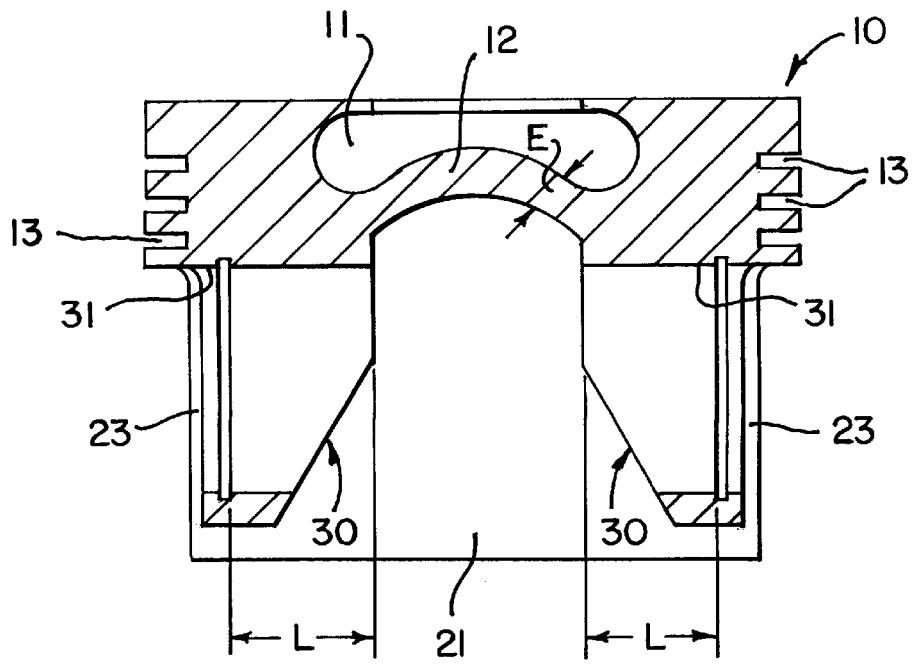
FIG. 2 represents an elevational sectional view of the piston of FIG. 1, turned in 90 degrees and according to the direction indicated by arrow II of FIG. 1.
Figure 4:
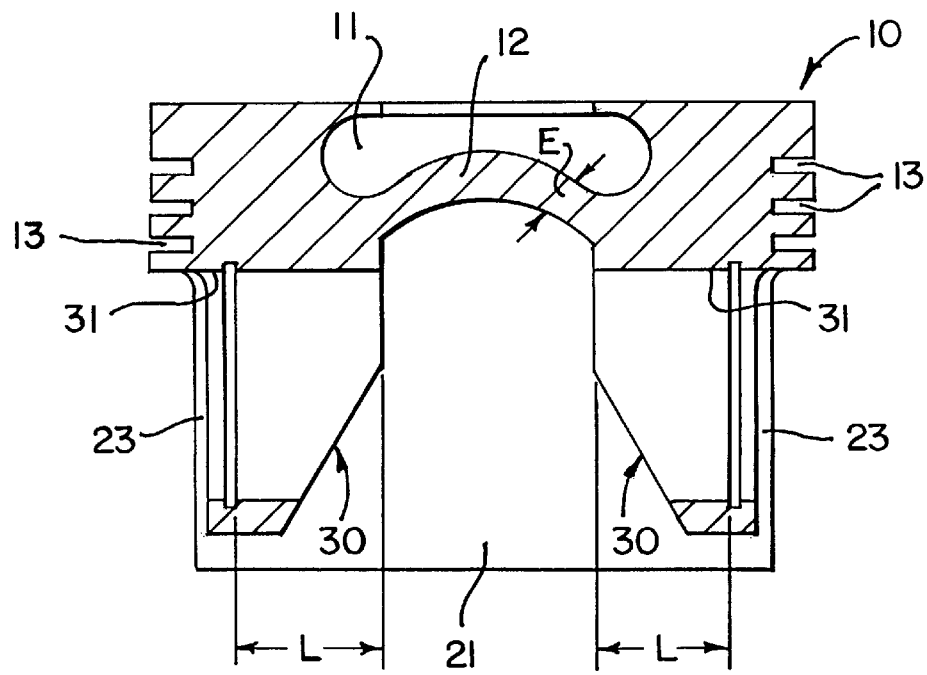
FIG. 4 represents an elevational sectional view of the piston of FIG. 3 turned in 90 degrees and seen according to the direction indicated by arrow IV of FIG. 3.

Both wrist pin bosses 30 are connected to the bottom wall 12 of the combustion chamber 11 by respective ribs 33 and to the first and second skirt axial extensions 21, 22 by respective lateral walls 23, which are radially back spaced towards the center of the piston, as illustrated in FIGS. 2 and 4.

The known pistons of the type described above and produced with more resistant alloys already allow certain advantageous results to be obtained, in terms of weight reduction, manufacturing cost and noise level during operation, as well as in terms of resistance to thermal and mechanical efforts. Considering the availability of light resistant alloys, with a density lower than about 3 $g/cm^3$ and yield stress higher than about 120 MPa at temperatures of the order of 300° C. to 350° C., such as it occurs with certain aluminum alloys obtained by quick solidification by the spray compacting process, the construction of the known pistons for high speed Diesel engines (about 4,500 rpm) with peak combustion pressures higher than 10 or 12 MPa and maximum piston temperatures of about 330° C., has led to relationships of piston weight/kilowatt power for each engine cylinder situated in the range of 24–26. Said alloys generally present a nominal composition of 73% aluminum, 20% silicon, 5% iron and 2% nickel.

As illustrated in the table presented below, said known weight/power relationships result from determined dimensional parameters applied to the piston. According to the prior art, the piston burning zone defined between the uppermost peripheral groove 13 and the upper face of the piston head 10 has a height H which varies from 7.5 to 13 mm, whereas the thickness E of the bottom wall 12 of the combustion chamber 11 varies between 9 and 20% of the diameter D of the piston head 10, and the projected bearing area by which the piston is supported on the wrist pin, defined as being twice the product of the diameter d of the hole 31 by its axial extension L, varies between 13 and 22% of the square of the diameter D of the piston head 10.

Considering a piston with a diameter of about 70 to about 100 mm and constructed in a single piece from a light resistant alloy having the above described characteristics, the invention starts to produce its advantageous results when the height H of the piston burning zone presents 4–8 mm, the new thickness E of the bottom wall 12 of the combustion chamber 11 varies from 5–9% of the diameter D of the piston and the axial extension L for supporting the wrist pin is narrowed in about 20–30% in relation to the known pistons. Particularly, the said projected bearing area by which the piston is supported on the wrist pin is reduced to a relationship of about 7–14% the square of the piston diameter D. These three new dimensional relationships together allow the piston to have a relationship of at least about 17 g/kW of power for each engine cylinder, which relationship is not reached by any of the known constructive solutions.

In the following table, there are shown the dimensions which are generally found in pistons considered light and resistant, as well as the typical dimensions of the piston of the present invention, together with the respective weight/power rates of the engine for each case:

| Reference Dimension | Prior Art | Invention | Piston weight/kW for each engine cylinder Prior Art (g/kW) | Piston weight/kW for each eng. cyl. approx. max. value Invention (g/kW) |
|---|---|---|---|---|
| H (mm) | 7.5–13 | 4–8 | 24–26 | 17 |
| Thickness E | 9%–20% | 5%–9% D | 24–26 | 17 |
| Projected bearing area of the piston on the wrist pin A = 2dL | 13%–22% $D^2$ | 7%–14% $D^2$ | 24–26 | 17 |

According to a second aspect of the invention, mainly related to the elasticity of the two skirt axial extensions 21, 22, the lateral walls 23 are provided with respective lower edges 25 and 26, which match mutually and which are tangent to the wrist pin bosses 30, said lateral wall edges 25 and 26 being medianly upwardly bent towards the head portion 10 of the piston, so as to form respective recesses 25a and 26a of material suppression in these piston peripheral regions, in which there is no need for providing guide means for the piston within the motor cylinder.

In the embodiments of FIGS. 1 and 2, the recesses 25a, 26a overpass the lower transversal plane PI which is inferiorly tangent to the wrist pin bosses 30, but they do not overpass the upper transversal plane PS containing the axes of the wrist pin bosses 30.

Figure 3:
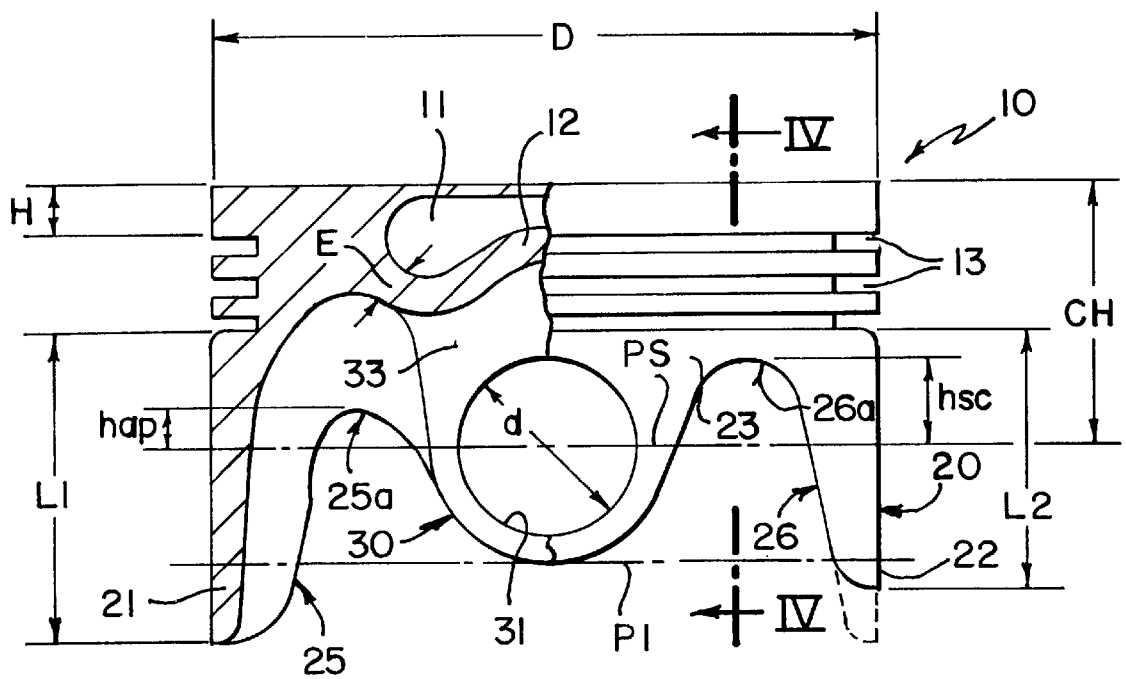
FIG. 3 represents a similar view to that of FIG. 1, according to another embodiment of the invention.

Nevertheless, according to the embodiment of FIGS. 3 and 4, the recesses 25a, 26a can be advantageously dimensioned in order to have their closest point to the head portion 10 positioned above said upper transversal plane PS and within certain dimensional limits that take into account the difference of the piston efforts at the first and second skirt axial extensions 21, 22, respectively on the pressure and counter pressure sides of the piston.

Specifically, for both embodiments, taking as reference the upper transversal plane PS, the recesses 25 on the pressure side of the piston have their closest point to the head portion 10 situated between a transversal plane downwardly spaced from said upper transversal plane PS by a height hip corresponding to about 50% of diameter d of the holes 31 of the wrist pin bosses 30 and a transversal plane upwardly spaced from said upper transversal plane PS by a height hsp corresponding to about 10% of the diameter d of the holes 31, whereas at the counter pressure side, which is subject to less efforts, the respective recesses 26a have the closest point to the head portion 10 situated between transversal planes which are downwardly and upwardly spaced from said upper transversal plane PS by heights hic and hsc, each corresponding to about 50% of the diameter d of the holes 31.

Also due to said differentiated efforts which occur on the pressure and counter pressure sides and in order to give more balance, the piston has different lengths for the skirt portions 20, the length L2 of the second skirt axial extension 22 on the counter pressure side being shorter than the length L1 of the first skirt extension 21 on the pressure side. Particularly, the piston has the length L1 of the first skirt axial extension 21 on the pressure side ranging between 80% and 110% of the compression height CH and the length L2 of the second skirt axial extension 22 on the counter pressure side ranging between 60% and 90% of the compression height CH.

What is claimed is:

1. A piston for an internal combustion engine, for high speed Diesel engines used in passenger or light load cars, comprising in a single piece: a head portion (10), which has a diameter (D) of about 70 to about 100 mm and which is provided with an upper median recess defining a combustion chamber (11) having a bottom wall (12) with a thickness (E) and a plurality of peripheral grooves (13) for mounting piston rings; a skirt portion (20) extending downwardly from the lowermost peripheral grooves (13) by a first skirt axial extension (21) and a second skirt axial extension (22) diametrically opposite to the first one; and a pair of wrist pin bosses (30) connected to the bottom wall (12) of the combustion chamber (11) and to the first and second skirt axial extensions (21, 22) by respective lateral walls (23) which are radially back spaced, each wrist pin boss (30) having a hole (31) for bearing the wrist pin of the piston, characterized in that the single piece is made from an alloy with a density which is lower than about 3 g/cm³ and with a yield stress which is higher than about 120 Mpa at temperatures of about 300° C. and having: a height (H) of 4–8 mm for the burning zone defined between the piston upper face and the uppermost peripheral groove (13); a thickness (E) for the bottom wall (12) of the combustion chamber (11) corresponding to 5–9% of the piston diameter (D); and a projected bearing area which is the projection of the upper half of hole (31) onto an upper transversal plane (PS) of the piston, by which the piston is supported on the wrist pin equal to twice the product of the diameter (d) of the hole (31) by its axial extension (L) and corresponding to 7–14% of the square of the piston diameter (D).

2. Piston, as in claim 1, characterized in that the alloy is an aluminum alloy, which is quickly solidified by the spray compacting process and which has a density lower than about 3 g/cm³ and a yield stress higher than about 120 MPa at temperatures of the order of 300° C–350° C.

3. Piston, as in claim 2, characterized in that the alloy presents a nominal composition of 73% aluminum, 20% silicon, 5% iron and 2% nickel.

4. Piston, as in claim 1, characterized in that the lateral walls (23) have their respective lower edges (25, 26) on the pressure and counter pressure sides of the piston mutually matching with and tangent to the wrist pin bosses (30), said lower edges (25, 26) being medianly upwardly bent in order to form respective recesses (25a, 26a) of material suppression.

5. Piston, as in claim 4, characterized in that the recesses (25a) on the piston pressure side have their points closest to the piston head portion (10) situated between a transversal plane downwardly spaced from an upper transversal plane (PS) containing the common axes of the holes (31) of the wrist pin bosses (30) by a height (hip) corresponding to about 50% of the diameter (d) of the holes (31) and a transversal plane upwardly spaced from said upper transversal plane (PS) by a height (hsp) corresponding to about 10% of the diameter (d) of the holes (31), whereas on the piston counter pressure side the respective recesses (26a) have the closest point to the head portion (10) situated between transversal planes which are downwardly and upwardly spaced from said upper transversal plane (PS) by heights (hip, hsc), each corresponding to about 50% of the diameter (d) of the holes (31).

6. Piston, as in claim 1, characterized in that the length (L1) of the first skirt axial extension (21) on the piston pressure side has a value corresponding to 80%–110% of the compression height (CH), whereas the length (L2) of the second skirt axial extension (22) on the counter pressure side has a value corresponding to 60%–90% of the compression height (CH).

* * * * *